No. 719,786. PATENTED FEB. 3, 1903.
P. J. & E. H. GATES.
COOKING UTENSIL.
APPLICATION FILED APR. 10, 1902.
NO MODEL. 2 SHEETS—SHEET 1.

WITNESSES
E. Mitchell.
Peter A. Ross.

INVENTORS:
Parker J. Gates
Eugene H. Gates
By Henry Connett
ATTORNEY.

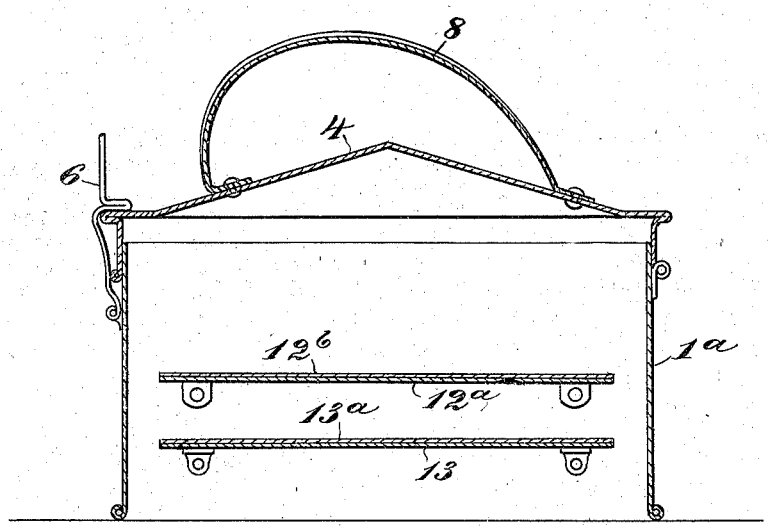

UNITED STATES PATENT OFFICE.

PARKER J. GATES, OF WEST NEW BRIGHTON, AND EUGENE H. GATES, OF FLUSHING, NEW YORK.

COOKING UTENSIL.

SPECIFICATION forming part of Letters Patent No. 719,786, dated February 3, 1903.

Application filed April 10, 1902. Serial No. 102,150. (No model.)

*To all whom it may concern:*

Be it known that we, PARKER J. GATES, residing at West New Brighton, in the county of Richmond, and EUGENE H. GATES, residing at Flushing, Queens county, in the State of New York, citizens of the United States, have jointly invented certain new and useful Improvements in Cooking Utensils, of which the following is a specification.

This invention relates to the class of utensils to be set on the range or stove or over an open fire or flame for baking purposes in the main; and it has for its object a utensil especially well adapted for use on the top of the range for baking potatoes and the like. The construction provides a closed cooking-chamber in which continuous circulation of hot air is attained. It provides also a chamber wherein the heat is substantially uniform at all points, and it also provides access of the hot air equally to substantially all parts of the article being baked.

Figure 1:
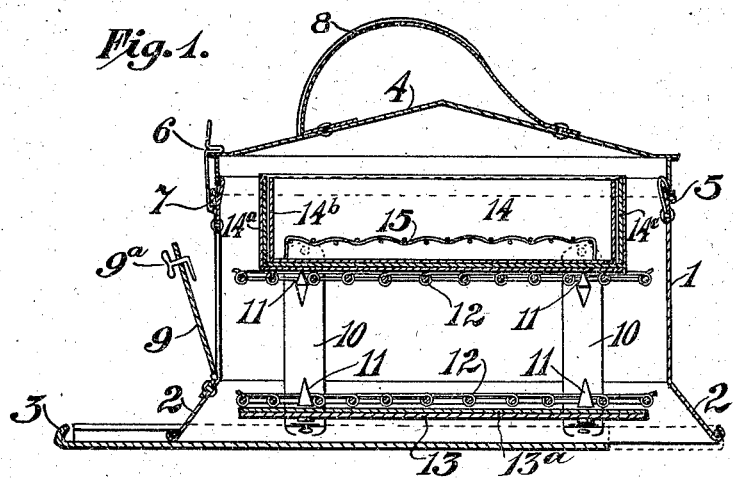
Figure 2:
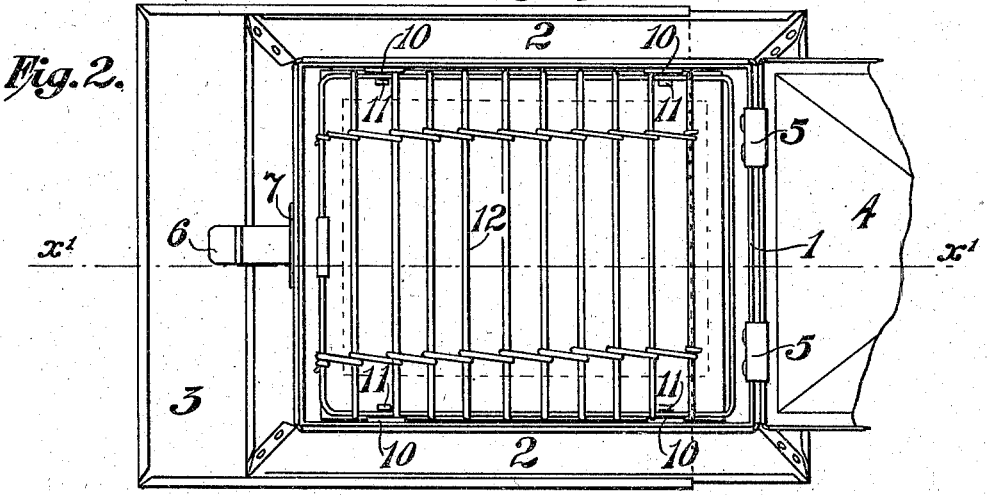
Figure 3:
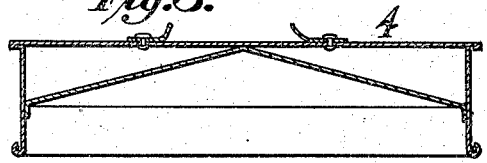
Figure 4:
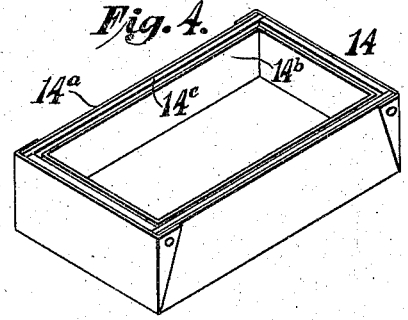

In the accompanying drawings, which illustrate an embodiment of the invention, Figure 1 is a vertical mid-section of the utensil in the plane indicated by line $x'$ in Fig. 2, and Fig. 2 is a plan of the same with the cover thrown open and partly broken away. Fig. 3 illustrates a modified construction of the cover, and Fig. 4 is a perspective view of the tray or pan. Fig. 5 is a sectional view similar to Fig. 1, illustrating a slightly-different construction.

Preferably the utensil will be constructed of sheet metal, of rectangular form, and of about the proportions shown. 1 is the body of the utensil, provided with a flared base 2. Normally the bottom is open, but it may be closed by a sliding sheet-metal bottom 3, represented as partly withdrawn in Figs. 1 and 2. This is for purposes of illustration only. Normally the bottom 3 will be removed, and its object when applied will be hereinafter explained.

On the body 1 is a cover 4, hinged to the body at 5 and provided with a securing-latch 6, hinged to the body at 7. This latch takes over the margin of the cover, as seen in Fig. 1, and may be conveniently turned back with the finger when the cover is to be raised. The cover has a loop handle 8. In the end of the body is a door 9, provided with a fastening device $9^a$ and hinged at its lower edge so as to turn down. We prefer to provide the utensil with both a door 9 and a cover 4, as both are convenient for certain kinds of baking; but obviously some utensils may be provided with a cover only and others with a door only. On the side walls of the body, inside, are secured upright strips 10, two at each side, and these are provided with supporting-hooks 11 to receive and uphold one or more wire grids 12. Secured to the strips 10, below the lowest set of hooks 11, is a sheet-metal baffle-screen 13, which is of somewhat less dimensions than the body, so that the hot air may rise about its margins and enter the closed chamber of the utensil above the screen or shield. In fact, this screen is placed down within the flared base, so that, although its dimensions may be nearly as great as that of the upper part of the body, ample space will be left about its edges for the upward flow of hot air.

The tray or pan (designated as a whole by the numeral 14) consists, essentially, of two pans $14^a$ and $14^b$, one nested within the other, and an interlining $14^c$, of asbestos. This pan may be set on either the upper or lower grid, as occasion may require. In it is shown in Fig. 1 a removable grid 15, which may be of ordinary wire-gauze of coarse mesh—say of a half-inch mesh—bent at the ends to form a support to elevate the grid above the bottom of the pan.

It is desirable for the proper deflection downward of the hot air rising in the utensil that the cover should have four inclined faces, as indicated in Figs. 1 and 2, and these faces may be formed in the cover itself; but the cover may be flat on top, as shown in Fig. 3, and have a lining of tin-plate or similar metal with inclined faces.

The leading purpose of our utensil is to apply the hot air or gases equally to all the outer surface of the article being cooked or baked, and to effect this we so construct the utensil as to screen the lower side of articles, where the heat is greatest, to a degree sufficient to equalize the temperature, and we provide an open-work support for the article, so that it may not rest on a sheet of metal, which would not only exclude hot air from free access to its under side, but cause it to burn on the under side.

When cooking over an open fire, a gas-flame, or an oil-burner, the removable sheet-metal bottom 3 is slipped on, or it may be put on in cases where it is desirable that the products of combustion shall not enter the cooking-chamber of the utensil.

When baking in the pan 13, it is sometimes desirable or convenient to leave the cover of the utensil closed and use the door in the end for the insertion of the pan onto the grid or support.

The baffle 13 will have by preference secured to it a sheet of asbestos, 13ª, and this latter may be on either the upper or lower surface of the metal sheet.

We prefer to employ the flared base 2, as it appears to gather in the heat from the stove-top; but our invention is not restricted thereto. Fig. 5 illustrates a form or construction of the utensil wherein the flared base and the strips 10 are omitted, these latter being mere conveniences of construction. In the construction of this Fig. 5 the door 9 is omitted and the cover 4 alone employed. In lieu of a grid 12 and pan 14 there is a supporting-plate 12ª, consisting of a sheet of metal with a superposed sheet of asbestos 12ᵇ, similar to the bottom of the pan 14. It will be seen that the sides of the body 1ª are perpendicular.

The characteristic feature of our invention we believe to be the chamber closed above and open only at the bottom, which will be closed in use by the stove-top, and the baffle or screen in the form of a flat plate, not necessarily having any elevated marginal rims or slides and so disposed as to occupy the central field of the open bottom, but elevated above the latter.

Having thus described our invention, we claim—

1. A cooking utensil having a flared base, the chamber in said utensil being open only at the bottom, a baffle-screen in the lower, flared part of said chamber, and a removable bottom for said chamber, whereby the latter may be left open or be closed at will.

2. A closed cooking or baking utensil, having a flared base, a flat baffle-screen in said flared base and of such dimensions as to provide a space at each of its four sides for the flow of air upward, and a grid or grids to support the article to be cooked.

3. A closed cooking utensil having a flared base, a baffle-screen composed of a metal plate and a sheet of asbestos, means for getting access to the interior, and a support for the article to be cooked.

In witness whereof we have hereunto signed our names, this 5th day of April, 1902, in the presence of two subscribing witnesses.

PARKER J. GATES.
EUGENE H. GATES.

Witnesses:
JOHN HOLZHAMER,
CHAS. H. KENDRICK.